(12) United States Patent
Suganuma et al.

(10) Patent No.: US 12,090,445 B2
(45) Date of Patent: Sep. 17, 2024

(54) TUBE UNIT AND DEGASSING MODULE

(71) Applicant: DIC Corporation, Tokyo (JP)

(72) Inventors: Youhei Suganuma, Ichihara (JP); Kazuyasu Kawashima, Ichihara (JP); Akira Sato, Ichihara (JP); Kazumi Oi, Ichihara (JP)

(73) Assignee: DIC Corporation, Tokyo (JP)

( * ) Notice: Subject to any disclaimer, the term of this patent is extended or adjusted under 35 U.S.C. 154(b) by 12 days.

(21) Appl. No.: 17/634,243

(22) PCT Filed: Aug. 11, 2020

(86) PCT No.: PCT/JP2020/030627
§ 371 (c)(1),
(2) Date: Feb. 10, 2022

(87) PCT Pub. No.: WO2021/029415
PCT Pub. Date: Feb. 18, 2021

(65) Prior Publication Data
US 2022/0331713 A1     Oct. 20, 2022

(30) Foreign Application Priority Data
Aug. 13, 2019  (JP) ................. 2019-148514

(51) Int. Cl.
*B01D 63/06*      (2006.01)
*B01D 19/00*      (2006.01)

(52) U.S. Cl.
CPC ....... *B01D 63/069* (2022.08); *B01D 19/0031* (2013.01); *B01D 2313/13* (2013.01); *B01D 2313/23* (2013.01)

(58) Field of Classification Search
CPC .. B01D 63/06; B01D 63/069; B01D 19/0031; B01D 2313/042; B01D 2313/13; B01D 2313/23
See application file for complete search history.

(56) References Cited

U.S. PATENT DOCUMENTS 6,228,146 B1    5/2001  Kuespert
2007/0186773 A1*  8/2007  Aonuma ............. C01B 13/0251
                                                    95/273
(Continued)

FOREIGN PATENT DOCUMENTS

JP    H01131392 A    5/1989
JP    2005058950 A    3/2005
(Continued)

OTHER PUBLICATIONS

Feb. 9, 2023, the Extended European Search Report issued by the European Patent Office in the corresponding European Patent Application No. 20853304.2.

(Continued)

*Primary Examiner* — Robert Clemente
(74) *Attorney, Agent, or Firm* — KENJA IP LAW PC

(57) ABSTRACT

A tube unit includes multiple tubes and bundling portions that bundle end portions of respective tubes at opposite ends of the tubes. At least one of the end portions of respective tubes has a tube wall portion that tubularly extends in an extension direction of the tubes and also has a protrusion protruding radially outward from the tube wall portion.

5 Claims, 6 Drawing Sheets

(56) References Cited

U.S. PATENT DOCUMENTS

2019/0168135 A1   6/2019   Tanizaki et al.
2019/0255464 A1   8/2019   Fujieda et al.

FOREIGN PATENT DOCUMENTS

| JP | 2010264405 A | 11/2010 |
| JP | 2014104383 A | 6/2014 |
| JP | 2015016400 A | 1/2015 |
| JP | 2015029927 A | 2/2015 |
| JP | 2018153715 A | 10/2018 |
| JP | 2019181356 A | 10/2019 |
| WO | 2018003840 A1 | 1/2018 |
| WO | 2018034183 A1 | 2/2018 |

OTHER PUBLICATIONS

Oct. 20, 2020, International Search Report issued in the International Patent Application No. PCT/JP2020/030627.

* cited by examiner

FIG. 5
(a)
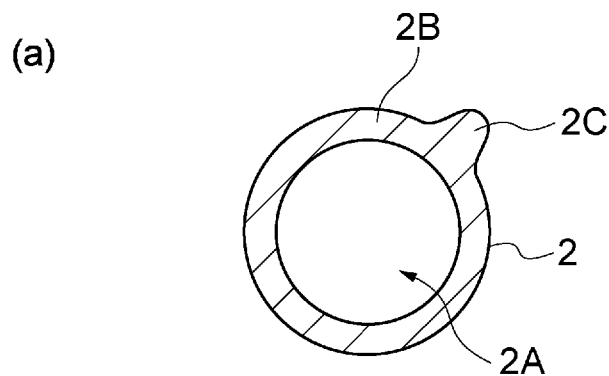
(b)
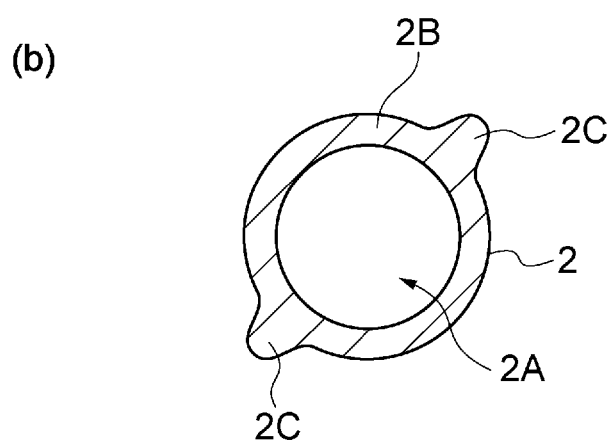
(c)
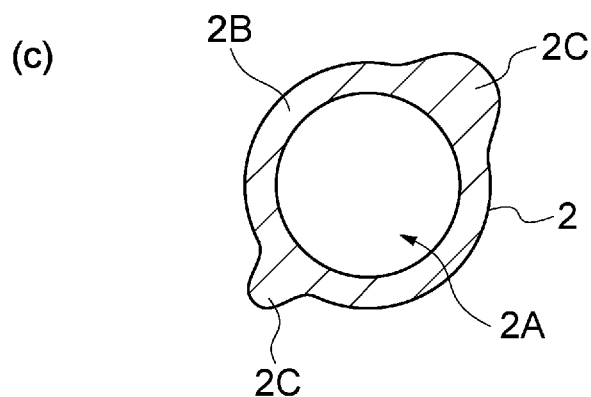

TUBE UNIT AND DEGASSING MODULE

TECHNICAL FIELD

The present invention relates to a tube unit in which multiple tubes are bundled at both ends and also to a degassing module that includes the tube unit.

BACKGROUND ART

PTL 1 below describes a bundle of fluororesin tubes in which end portions of respective tubes are bundled together. The bundle of fluororesin tubes includes bundled fluororesin tubes, a fluororesin sleeve fitted around each end portion of the bundle of fluororesin tubes, and a connection portion that is made of a thermally fluidizing fluororesin and that integrally joins the fluororesin sleeve to the fluororesin tubes. Each end portion of the fluororesin tubes is shaped cylindrically.

CITATION LIST

Patent Literature

PTL 1: Japanese Unexamined Patent Application Publication No. 1-131392

SUMMARY OF INVENTION

Technical Problem

In the bundling structure in which the end portions of respective tubes are bundled, the bundling strength increases as the end portions of the tubes are bundled more densely. In the bundle of the fluororesin tubes described in PTL 1, the end portions of respective fluororesin tubes are each shaped cylindrically, which limits the degree of density of the end portions when the end portions are arranged to form a fine structure. This imposes a limit on the improvement of the bundling strength when the end portions of the fluororesin tubes are bundled.

An object of one aspect of the present invention is to provide a tube unit and a degassing module with which the bundling strength of the tubes can be improved.

Solution to Problem

A tube unit according to an aspect of the present invention includes multiple tubes and bundling portions that bundle end portions of respective tubes at opposite ends of the tubes. At least one of the end portions of respective tubes has a tube wall portion that tubularly extends in an extension direction of the tubes and also has a protrusion protruding radially outward from the tube wall portion.

In this tube unit, at least one of the end portions of respective tubes has a protrusion protruding radially outward. Accordingly, protrusions can be disposed, for example, in the space among the tube wall portions and tubes adjacent to the tube wall portions. Accordingly, the end portions of respective tubes can be arranged more densely compared with the case in which the end portions do not have the protrusions. This can improve the bundling strength of the tubes.

Each of the end portions of respective tubes may have the tube wall portion and the protrusion. In the tube unit, each of the end portions of respective tubes has the tube wall portion and the protrusion. This enables the protrusions to be positioned among the tube wall portions while, for example, the tube wall portions are disposed so as to form a fine structure. Accordingly, the end portions of the tubes can be disposed more densely, which can improve the bundling strength of the tubes.

The tube wall portion may cylindrically extend in the extension direction of the tubes. In the tube unit, the tube wall portion cylindrically extends in the extension direction of the tubes, which can reduce the pressure loss of a fluid flowing through the tubes.

Each bundling portion may have an outer sheath fitted around the tubes and a sealing portion that fills a space among the end portions of respective tubes and the outer sheath. In the tube unit, the sealing portion fills the space among the end portions of the tubes and the outer sheath, which reduces the likelihood of the liquid leaking out among the tubes when a fluid, such as a liquid or a gas, is supplied to the end face of the bundling portion.

The end portions of respective tubes may be spaced from each other. In the tube unit, the end portions of respective tubes are spaced from each other, and the end portions are thereby covered with the sealing portion. This can reduce the likelihood of the fluid leaking out at the interfaces of the end portions of the tubes.

A degassing module according to another aspect of the present invention includes any one of the tube units described above and a housing in which the tube unit is accommodated. Each of the tubes is a tubular membrane that allows gas to pass and prohibits liquid from passing. In addition, the housing has a first opening and a second opening both of which are in communication with interior spaces of respective tubes. The housing also has a suction port being in communication with a space outside the tubes.

In the degassing module, a liquid is supplied to the first opening and is discharged from the second opening while gas is suctioned from the suction port. The liquid supplied to the first opening is degassed while flowing through the tubes and is discharged from the second opening. The degassing module includes the above-described tube unit that improves the bundling strength of the tubes. This can improve the durability of the degassing module while reducing the likelihood that the liquid supplied to the first opening leaks out into the space outside the tubes.

Advantageous Effects of Invention

According to an aspect of the present invention, the bundling strength of the tubes can be improved.

BRIEF DESCRIPTION OF DRAWINGS

FIG. 5(*a*), FIG. 5(*b*), and FIG. 5(*c*) are schematic cross-sectional views illustrating examples of tubes.

DESCRIPTION OF EMBODIMENTS

Figure 1:
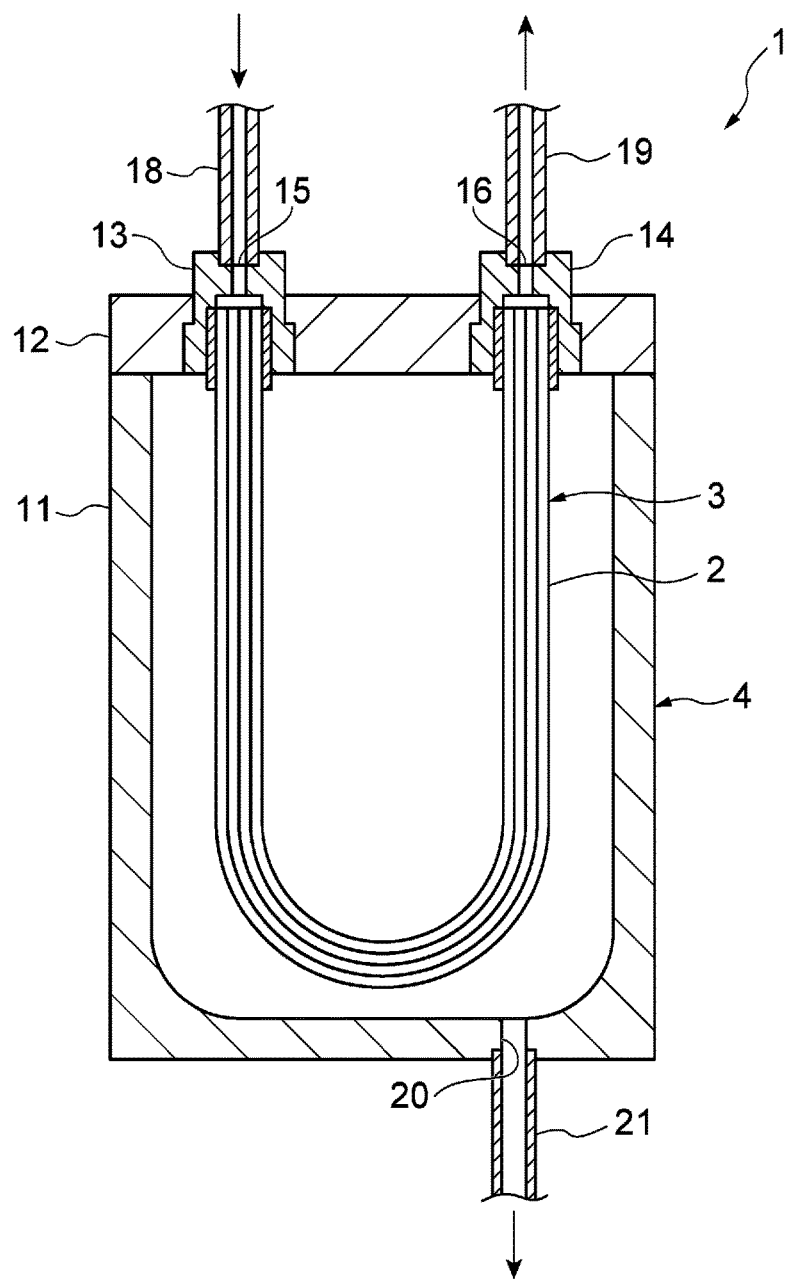
FIG. 1 is a schematic cross-sectional view illustrating an example of a degassing module.

A tube unit and a degassing module according to an embodiment will be described with reference to the drawings. Note that the same or equivalent elements will be denoted by the same reference signs in the drawings and duplicated descriptions will be omitted.

FIG. 1 is a schematic cross-sectional view illustrating an example of a degassing module. As illustrated in FIG. 1, a degassing module 1 includes a tube unit 3 in which multiple tubes 2 are bundled at both ends and also includes a housing 4 that accommodates the tube unit 3. The degassing module 1 has a first region and a second region in the housing 4. The tubes 2 have respective interior spaces 2A (see FIG. 4) that are referred to as the first region. The second region is a space 4A outside the tubes 2. A liquid is supplied to the first region, while gas in the second region is suctioned. The degassing module 1 degasses the liquid by supplying the liquid into the interior spaces 2A (the first region) of respective tubes 2 and by suctioning gas in the space 4A outside the tubes 2 (the second region).

Each tube 2 is a tubular membrane that allows gas to pass but prohibits liquid from passing. The material of the tube 2 and the shape, type, or the like of the membrane are not specifically limited. For example, the material of the tube 2 is fluororesin, polypropylene (PP), polymethylpentene (PMP), silicone, polyimide, or polyamide. Examples of the fluororesin may be polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (ethylene copolymer) (ETFE), polychlorotrifluoroethylene (PCTFE), amorphous fluoropolymer (AF), and polyvinylidene fluoride (PVDF). An example of the amorphous fluoropolymer may be Teflon® AF.

Figure 2:
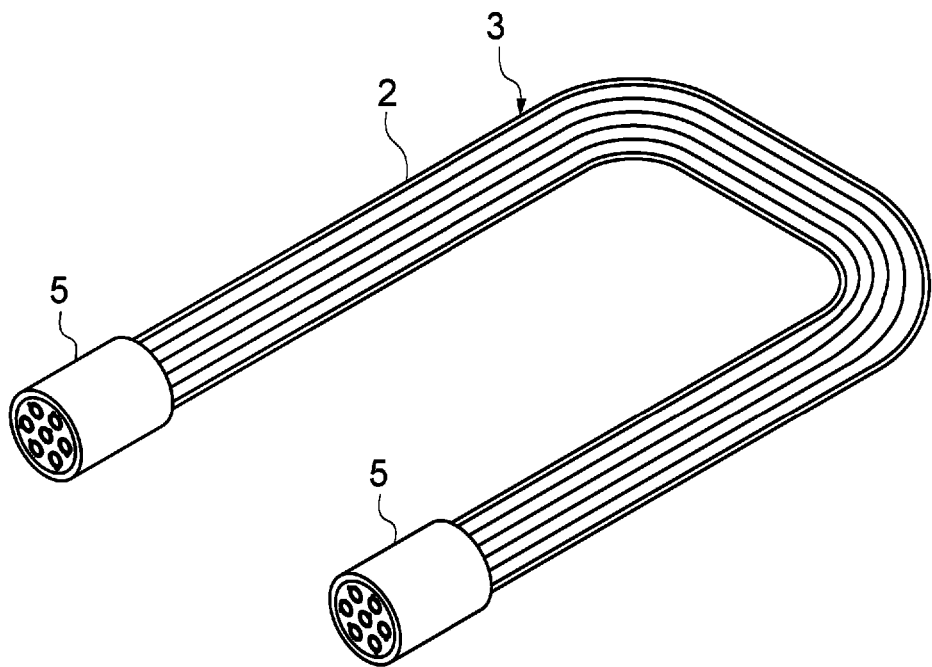
FIG. 2 is a schematic perspective view illustrating an example of a tube unit.
Figure 3:
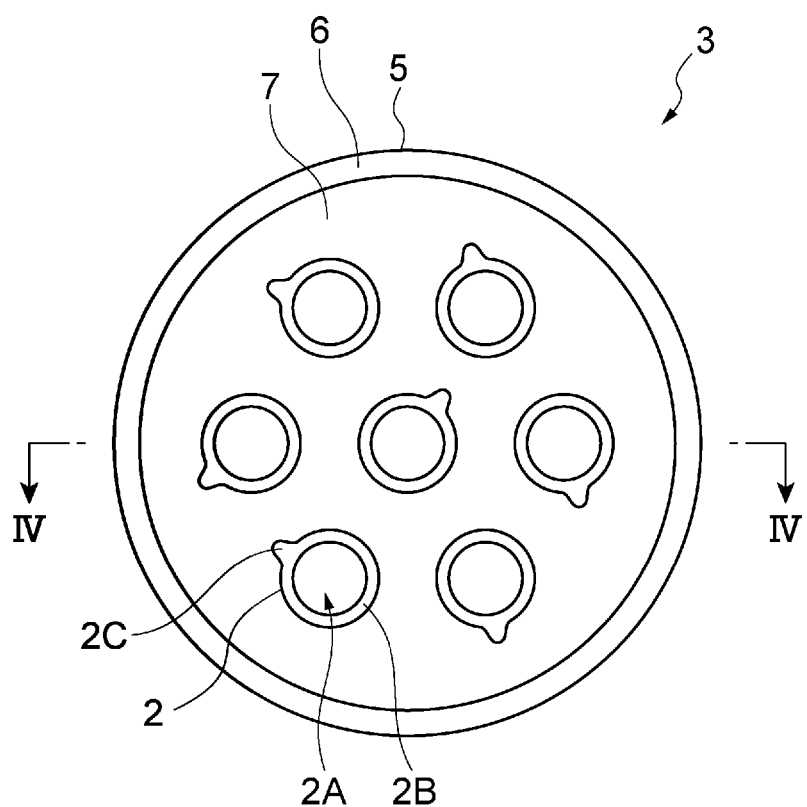
FIG. 3 is a schematic end view illustrating an example of the tube unit.
Figure 4:
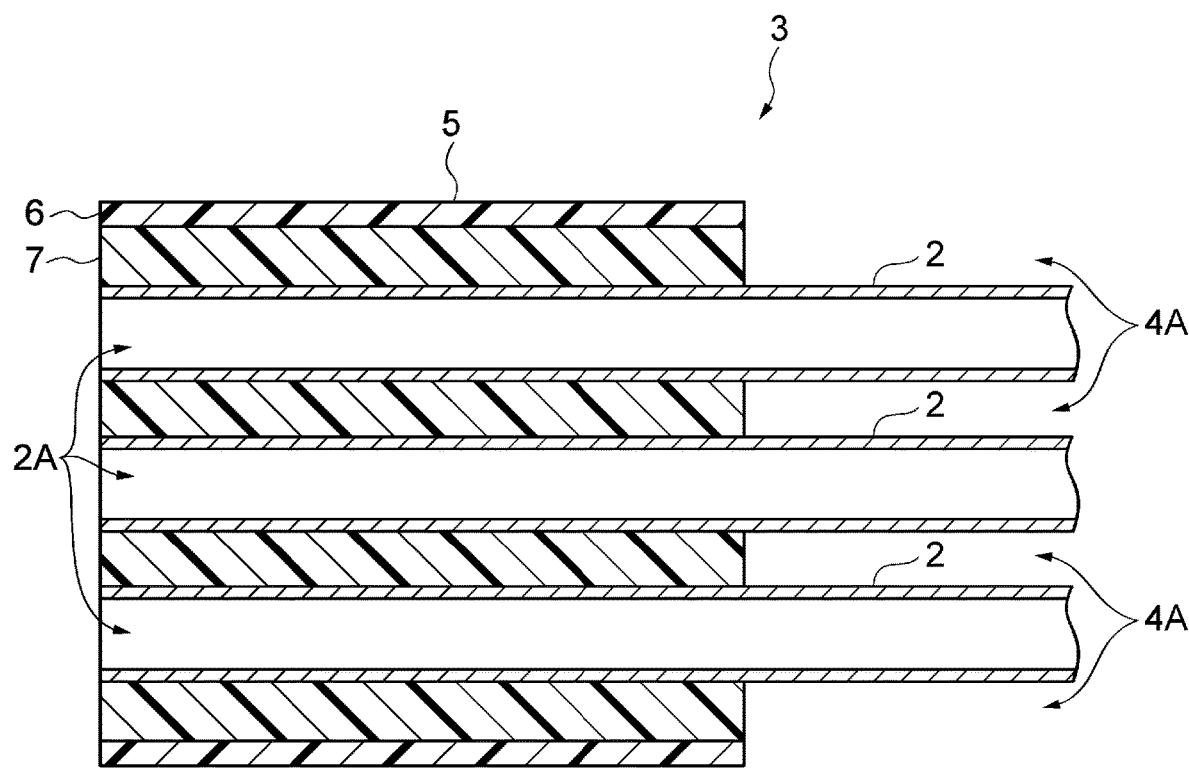
FIG. 4 is a schematic cross-sectional view taken along line IV-IV in FIG. 3.

FIG. 2 is a schematic perspective view illustrating an example of a tube unit, and FIG. 3 is a schematic end view illustrating the example of the tube unit. FIG. 4 is a schematic cross-sectional view taken along line IV-IV in FIG. 3. Note that these figures illustrate an example of a tube unit 3 that includes seven tubes 2. The number of the tubes 2, however, is not specifically limited. As illustrated in FIGS. 2 to 4, the tube unit 3 is formed by bundling the multiple tubes 2 at both ends thereof. In other words, the tube unit 3 includes the multiple tubes 2 and a pair of bundling portions 5 that bundle the tubes 2 at one ends and at opposite ends, respectively. A pair of the bundling portions 5 are portions to be attached to the housing 4. Note that a pair of the bundling portions 5 are structured similarly to each other and accordingly the following description will focus on one of the bundling portions 5 as a representative example. A pair of the bundling portions 5, however, may be structured differently.

Each bundling portion 5 includes an outer sheath 6 and a sealing portion 7. The outer sheath 6 is fitted around end portions of the tubes 2, and the sealing portion 7 is a filling that fills the space among the end portions of the tubes 2 and the outer sheath 6.

The outer sheath 6 is formed substantially cylindrically and serves as the outermost layer of the bundling portion 5. The outer sheath 6 is a portion to be attached to the housing 4. For example, the material of the outer sheath 6 is a fluororesin, such as PFA or PTFE.

The sealing portion 7 fills the space among the end portions of the tubes 2 and the outer sheath 6. The sealing portion 7 thereby bundles the end portions of the tubes 2 and seals the space among the end portions of the tubes 2 and the outer sheath 6. In other words, the sealing portion 7 does not fill the interior spaces 2A of respective tubes 2, whereas the sealing portion 7 fills the space among the tubes 2 and the space between the tubes 2 and the outer sheath 6 (see FIG. 3). When the end face of the sealing portion 7 is viewed, only the interior spaces 2A of the tubes 2 are open. For example, the material of the sealing portion 7 is a fluororesin, such as FEP or PFA.

An end portion of each one of the tubes 2 bundled by the sealing portion 7 has a tube wall portion 2B and a protrusion 2C that protrudes from the tube wall portion 2B. The tube wall portion 2B is shaped cylindrically and extends in the extension direction of the corresponding tube 2. The protrusion 2C is a portion that protrudes radially outward from the tube wall portion 2B. For example, the protrusion 2C may be a thick wall portion (or a bulged portion) of the tube 2 or may be a curved portion formed as if part of the end portion of the tube 2 were pinched out. For example, the wall of the end portion of the tube 2 is made thicker at the protrusion 2C.

As illustrated in FIG. 5(*a*), the end portion of the tube 2 may have one protrusion 2C. Alternatively, as illustrated in FIG. 5(*b*) and FIG. 5(*c*), the end portion of the tube 2 may have multiple protrusions 2C. In the case of the tube 2 having multiple protrusions 2C, the protrusions 2C may be shaped similarly as illustrated in FIG. 5(*b*), or the protrusions 2C may be shaped differently as illustrated in FIG. 5(*c*).

The protruding directions of the protrusions 2C at the end portions of respective tubes 2 may be arranged in an orderly manner or may be arranged in a non-orderly manner. The protrusion 2C may extend so as to have the same shape in the extension direction of the tube 2 or may have different shapes. The protrusion 2C may be formed over the entire length of the end portion in the extension direction of the tube 2 or may be formed partially or intermittently. The end portions of the tubes 2 may be arranged arbitrarily. For example, the end portions of the tubes 2 may be arranged such that the tube wall portions 2B form a fine structure and multiple protrusions 2C are present among the tube wall portions 2B.

For example, the protrusion 2C may be provided by using a tube 2 having a thick portion that is formed in advance so as to serve as the protrusion 2C. Alternatively, for example, the protrusion 2C for each tube 2 may be formed by pinching part of the tube 2 using a tool. In this state, the sealing portion 7 fills the space among the outer sheath 6 and the end portions of the tubes 2 having such protrusions 2C.

As illustrated in FIG. 1, the housing 4 includes a housing body 11, a lid 12, a first connector 13, and a second connector 14.

The housing body 11 is a portion that accommodates the tube unit 3. The housing body 11 is a cylindrically shaped container having an opening at one end. The lid 12 is joined to the housing body 11 in a gas-tight manner and closes the opening of the housing body 11. For example, the lid 12 may be joined to the housing body 11 by welding, screw-fitting, or interfitting. The housing 4 may be formed integrally and the housing body 11 and the lid 12 may be inseparable, insofar as this does not cause any assembling problem.

The first connector 13 and the second connector 14 are joined to the lid 12 in a gas-tight manner. A first opening 15 pierces the first connector 13 so as to communicate the inside and the outside of the lid 12 (the housing 4), and a second opening 16 pierces the second connector 14 so as to communicate the inside and the outside of the lid 12 (the housing 4). For example, the first connector 13 and the second connector 14 may be joined to the lid 12 by welding, screw-fitting, or interfitting.

The first connector 13 is joined gas-tightly to one of the bundling portions 5 of the tube unit 3. The first connector 13 thereby joins the one of the bundling portions 5 of the tube unit 3 gas-tightly to the housing. For example, the first connector 13 is shaped like a cylinder having a step portion and is disposed between the one of the bundling portions 5 of the tube unit 3 and the housing 4. A first pipe 18 is connected to the first connector 13. The first pipe 18 is in communication with the interior spaces 2A of the tubes 2. For example, the one of the bundling portions 5 of the tube unit 3 may be joined to the first connector 13 by welding, screw-fitting, or interfitting. For example, the first pipe 18 may be joined to the first connector 13 by welding, screw-fitting, or interfitting.

The second connector 14 is joined gas-tightly to the other one of the bundling portions 5 of the tube unit 3. The second connector 14 thereby joins the other one of the bundling portions 5 of the tube unit 3 gas-tightly to the housing. For example, the second connector 14 is shaped like a cylinder having a step portion and is disposed between the other one of the bundling portions 5 of the tube unit 3 and the housing 4. A second pipe 19 is connected to the second connector 14. The second pipe 19 is in communication with the interior spaces 2A of the tubes 2. For example, the other one of the bundling portions 5 of the tube unit 3 may be joined to the second connector 14 by welding, screw-fitting, or interfitting. For example, the second pipe 19 may be joined to the second connector 14 by welding, screw-fitting, or interfitting.

The housing body 11 has a suction port 20. The suction port 20 is an opening formed in the housing body 11, through which gas in the space 4A outside the tubes 2 and inside the housing 4 is suctioned. A third pipe 21 is connected to the suction port 20. The third pipe 21 is in communication with the space 4A outside the tubes 2 and inside the housing 4. A suction pump (not illustrated) is connected to the third pipe 21 to suction gas through the suction port 20, thereby depressurizing the space 4A outside the tubes 2 and inside the housing 4. The third pipe 21 may be joined to the suction port 20 by welding, screw-fitting, or interfitting.

The degassing module 1 structured as described above degasses a liquid in the following manner: the liquid is supplied to the first pipe 18 and discharged from the second pipe 19 while the suction pump connected to the third pipe 21 suctions gas in the space 4A outside the tubes 2 and inside the housing 4. The liquid supplied to the first pipe 18 subsequently enters the interior spaces 2A of the tubes 2 through the first connector 13. When the liquid flows through the interior spaces 2A of the tubes 2, the space 4A outside the tubes 2 and inside the housing 4 is in a depressurized state. Accordingly, dissolved gas or gas bubbles in the liquid are suctioned and pass through the walls of the tubes 2 into the space 4A outside the tubes 2 and inside the housing 4. Thus, the liquid is degassed. Consequently, the degassed liquid is discharged to the second pipe 19 from the second connector 14. Note that the liquid may be supplied to the second pipe 19 and discharged from the first pipe 18.

An example of a liquid to be degassed is an organic solvent or water.

Here, a tube unit 100 that does not have protrusions is described with reference to FIG. 6 as a comparative example.

Figure 6:
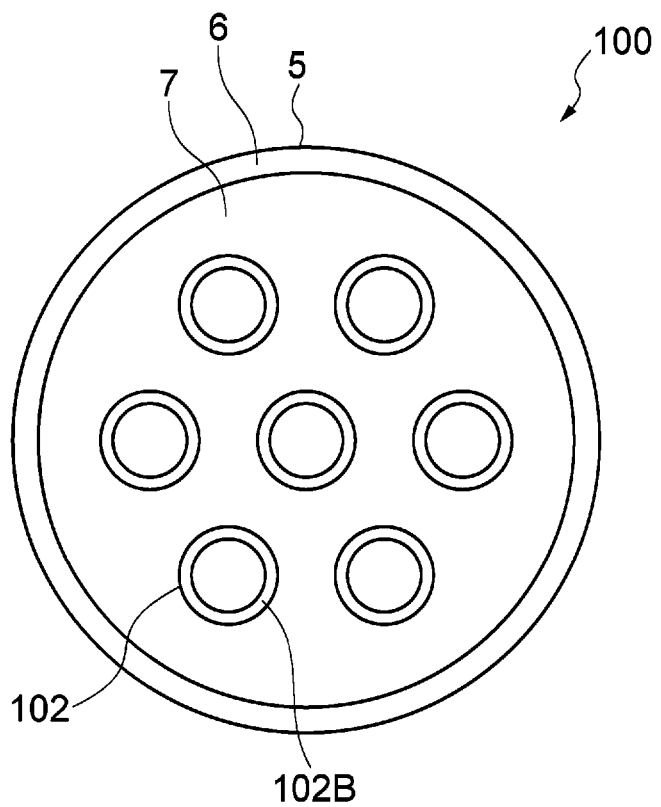
FIG. 6 is a schematic end view illustrating a tube unit of a comparative example.

As illustrated in FIG. 6, the tube unit 100 of the comparative example is structured such that the end portions of respective tubes 102 are formed only of cylindrical tube wall portions 102B that extend in the extension directions of the tubes 102, and the end portions of the tubes 102 do not have portions corresponding to the protrusions 2C of the present embodiment. The end portions of respective tubes 102 can be disposed densely by arranging the tube wall portions 102B so as to form a fine structure. The end portions of respective tubes 102, however, are not disposed in the space among the tube wall portions 102B.

On the other hand, in the tube unit 3 according to the present embodiment, the end portions of respective tubes 2 have the protrusions 2C protruding radially outward. Accordingly, the end portions of respective tubes 2 can be disposed such that the tube wall portions 2B form a fine structure and the protrusions 2C are positioned among the tube wall portions 2B. Accordingly, the end portions of the tubes 2 can be arranged more densely compared with the tube unit 100 of the comparative example. Thus, the bundling strength of the tubes 2 can be improved.

In addition, the cylindrically shaped tube wall portion 2B extends in the extension direction of the tube, which can reduce the pressure loss of a fluid flowing through the tube.

The sealing portion 7 fills the space among the end portions of the tubes 2 and the outer sheath 6, which reduces the likelihood of the liquid leaking out among the tubes 2 when a fluid, such as a liquid or a gas, is supplied to the end face of the bundling portion 5. In other words, when a liquid is supplied to the first pipe 18, the liquid is supplied only to the interior spaces 2A of the tubes 2. The likelihood of the liquid leaking out into the space 4A outside the tubes 2 and inside the housing 4 can be reduced.

The end portions of respective tubes 2 are spaced from each other, and the end portions are thereby covered with the sealing portion 7. This can reduce the likelihood of the fluid leaking out at the interfaces of the end portions of the tubes 2.

In the degassing module 1 of the present embodiment, the liquid is supplied to the first opening 15 and is discharged from the second opening 16 while gas is suctioned from the suction port 20. The liquid supplied to the first opening 15 is degassed while flowing through the tubes 2 and is discharged from the second opening 16. The tube unit 3 configured as described above improves the bundling strength of the tubes 2. This can improve the durability of the degassing module 1 while reducing the likelihood that the liquid supplied to the first opening 15 leaks out into the space 4A outside the tubes 2.

One embodiment of the present invention has been described. The present invention, however, is not limited to the above embodiment.

For example, in the above embodiment, the tube unit has been described as the one having seven tubes, but the number of the tubes of the tube unit is not specifically limited. For example, the tube unit may have several tens or several hundreds of tubes.

In addition, it has been described in the above embodiment that the end portions of respective tubes have the protrusions. However, all of the end portions of the tubes need not have the tube wall portions and the protrusions, and it is sufficient that at least one of the end portions of respective tubes has a tube wall portion and a protrusion. Even with this configuration, the end portions of the tubes can be arranged densely and the bundling strength of the tubes can be improved.

Moreover, it has been described in the above embodiment that the cylindrically shaped tube wall portion extends in the extension direction of the tube. The tube wall portion, however, may have an arbitrary shape insofar as the tube wall portion tubularly extends in the extension direction of each tube. For example, the tube wall portion may be shaped like a tube having an oval section or having a hexagonal section. Even in the case of the tube wall portion being shaped as such, the tube wall portions have the protrusions protruding therefrom, which enables the end portions of the tubes to be disposed densely and can improve the bundling strength of the tubes.

The sealing portion does not necessarily seal the space among the end portions of the tubes and the outer sheath if the tube unit of the present invention is not applied to the above-described degassing module but applied as other types of tube units.

REFERENCE SIGNS LIST 1 degassing module
2 tube
2A interior space
2B tube wall portion
2C protrusion
3 tube unit
4 housing
4A space
5 bundling portion
6 outer sheath
7 sealing portion
12 lid
13 first connector
14 second connector
15 first opening
16 second opening
18 first pipe
19 second pipe
20 suction port
21 third pipe
100 tube unit
102 tube
102B tube wall portion

The invention claimed is:

1. A degassing module comprising:
a tube unit; and
a housing in which the tube unit is accommodated, wherein
the tube unit comprises multiple tubes each having one end portion and an opposite end portion, a first bundling portion that bundles the one end portions of the multiple tubes, and a second bundling portion that bundles the opposite end portions of the multiple tubes, each of the tubes is a tubular membrane that allows gas to pass and prohibits liquid from passing,
the housing has
a first opening and a second opening both of which are in communication with interior spaces of respective tubes, and
a suction port being in communication with a space outside the tubes,
the first bundling portion is connected to the housing at the first opening,
the second bundling portion is connected to the housing at the second opening,
at least one of the end portions of the respective tubes has
a tube wall portion that tubularly extends in an extension direction of the tubes and
a protrusion protruding radially outward from the tube wall portion and formed partially in the extension direction of the tubes,
the housing has
a housing body that is cylindrically shaped and has an opening at one end,
a lid that closes the opening of the housing body,
a first connector that is jointed to the lid and has the first opening formed thereon, and
a second connector that is jointed to the lid and has the second opening formed thereon,
the first bundling portion is connected to the first connector, and
the second bundling portion is connected to the second connector.

2. The degassing module according to claim 1, wherein each of the end portions of the respective tubes has the tube wall portion and the protrusion.

3. The degassing module according to claim 1, wherein the tube wall portion cylindrically extends in the extension direction of the tubes.

4. The degassing module according to claim 1, wherein each of the first bundling portion and the second bundling portion has an outer sheath fitted around the tubes and a sealing portion that fills a space among the end portions of respective tubes and the outer sheath.

5. The degassing module according to claim 4, wherein the end portions of respective tubes are spaced from each other.

* * * * *